United States Patent [19]

Uchikoshi et al.

[11] Patent Number: 5,018,125
[45] Date of Patent: May 21, 1991

[54] SIGNAL PROCESSING CIRCUIT FOR DETECTING A TRACKING ERROR FOR AN OPTICAL DISK APPARATUS

[75] Inventors: Gohji Uchikoshi, Higashimurayama; Toshiko Otomo, Tokyo, both of Japan

[73] Assignee: Nakamichi Corporation, Tokyo, Japan

[21] Appl. No.: 304,351

[22] Filed: Jan. 31, 1989

[30] Foreign Application Priority Data

Feb. 4, 1988 [JP] Japan ................... 63-24689

[51] Int. Cl.$^5$ ............................................. G11B 7/095
[52] U.S. Cl. .................... 369/44.250; 369/44.34; 369/44.35; 369/54
[58] Field of Search ............. 369/32, 33, 44.25, 44.26, 369/44.28, 44.34, 44.35, 54, 55, 58, 111, 124; 360/77.02, 78.04, 78.06, 78.09, 78.11; 358/342, 907; 346/33 D

[56] References Cited

U.S. PATENT DOCUMENTS

| | | | |
|---|---|---|---|
| 4,541,083 | 9/1985 | Maeda et al. | 369/33 X |
| 4,544,872 | 10/1985 | Hirano et al. | 369/44.28 X |
| 4,663,751 | 5/1987 | Kaku et al. | 369/44.34 X |
| 4,730,290 | 3/1988 | Takasago et al. | 369/32 |
| 4,779,253 | 10/1988 | Getreuer et al. | 369/44.28 X |
| 4,785,442 | 11/1988 | Ohtake et al. | 369/44.34 X |
| 4,787,076 | 11/1988 | Deguchi et al. | 369/44.34 |
| 4,887,253 | 12/1989 | Tateishi | 369/44.28 X |
| 4,901,299 | 2/1990 | Makatsu | 369/43 X |

Primary Examiner—Roy N. Envall, Jr.
Assistant Examiner—W. R. Young
Attorney, Agent, or Firm—Pearne, Gordon, McCoy & Granger

[57] ABSTRACT

A signal processing circuit for an optical disk apparatus to detect a sine wave tracking error signal obtained when an optical spot on an optical disk moves in a direction of a radius of the optical disk and a sine wave whole reflection light quantity signal having a component of phase offset by 90 degrees relative to that of the tracking error signal and to deform the sine wave whole reflection light quantity signal so that a deformed signal is provided which has states of "H" and "L" selected on timing when the whole reflection light quantity signal traverses a center level of its amplitude.

3 Claims, 5 Drawing Sheets

SIGNAL PROCESSING CIRCUIT FOR DETECTING A TRACKING ERROR FOR AN OPTICAL DISK APPARATUS

BACKGROUND OF THE INVENTION

A whole reflection light quantity signal of a sine wave obtained when an optical spot on an optical disk moves in a direction of a radius of the optical disk is required to be deformed into a signal having states of "H" and "L" varying on timing when the whole light quantity signal traverses a center of its amplitude. Such a whole reflection light quantity signal has a DC component and an AC component and its level varies on variation in light quantity and in a reflection ratio of the optical disk. In a prior art reference, the deformed signal is provided by comparing the whole reflection light quantity signal with a comparison signal obtained by averaging the whole reflection light quantity signal. However, since such a comparison signal is obtained by using a time constant circuit such as a low pass filter, steep variation in the level of the whole reflection light quantity signal disturbs the comparison signal from following its variation and this causes the deformed signal to be never stably obtained.

SUMMARY OF THE INVENTION

Accordingly, it is a principal object of the invention to provide a signal processing circuit for an optical disk apparatus adapted to provide a stable deformed signal even though there is steep variation in a level of a whole reflection light quantity signal which is obtained when an optical spot moves in the direction of a radius of an optical disk.

In accordance with the present invention, there is provided a signal processing circuit for an optical disk apparatus to detect a sine wave tracking error signal obtained when an optical spot on an optical disk moves in the direction of a radius of said optical disk and a sine wave whole reflection light quantity signal having a component of phase offset by 90 degrees relative to that of said tracking error signal and to deform said sine wave whole reflection light quantity signal so that a deformed signal is provided which has states of "H" and "L" selected on timing when said whole reflection light quantity signal traverses a center level of its amplitude, said signal processing circuit comprising:

signal detection means to detect said tracking error signal and said whole reflection light quantity signal;

sample hold means to form on a switching signal a comparison signal having a state of sample signal proportional to said whole reflection light quantity signal at a predetermined ratio and a state of a hold signal obtained by holding said sample signal;

comparison means to provide a deformed signal having states of "H" and "L" by comparing said comparison signal with said whole reflection light quantity signal;

level determination means to provide a determination signal indicating whether a level of said tracking error signal is within an area of predetermined level near a center of its amplitude;

switch means to provide said switching signal on said deformed signal and said determination signal;

and said comparison signal being at said state of sample signal only when said tracking error signal is within said predetermined area and said determination signal is in one of its conditions while said comparison signal is at said state of hold signal when said tracking error signal and said determination signal are on the other condition.

According to the invention, there can be provided a deformed signal which has states of "H" and "L" selected on timing when the whole reflection light quantity signal traverses a center level of its amplitude.

BRIEF DESCRIPTION OF THE DRAWINGS

The above and other objects and features of the invention will be apparent from the description of the embodiment of the invention taken along with the accompanying drawings in which.

DETAILED DESCRIPTION OF PREFERRED EMBODIMENTS

Figure 1:
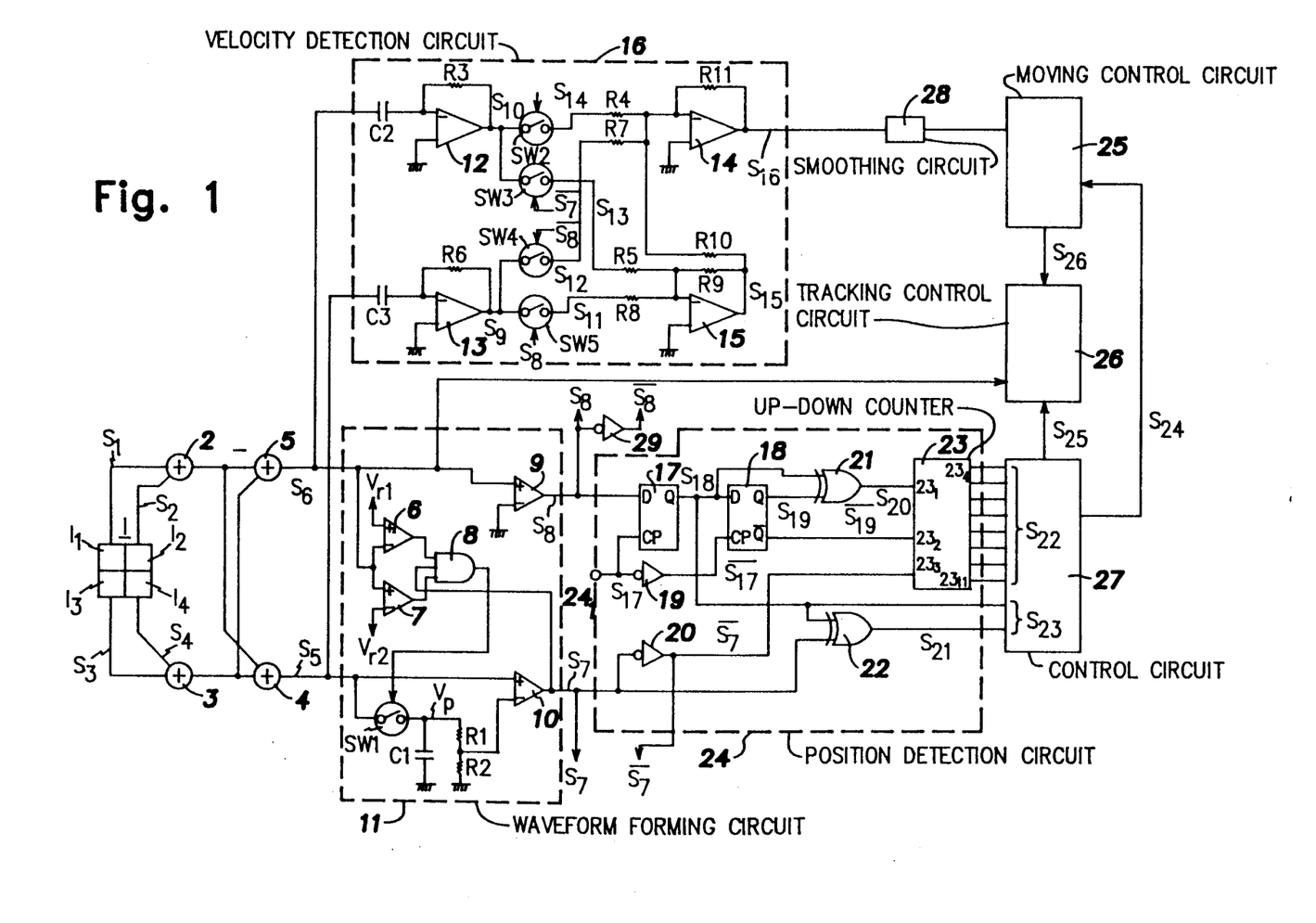
FIG. 1 is a schematic diagram of an optical spot control apparatus constructed in accordance with an embodiment of the invention.

FIG. 1 illustrates an optical disk apparatus having an optical spot control including a signal circuit constructed in accordance with one embodiment of the invention. A four dividing detector 1 is disposed within an optical pick-up not shown and scanning recording tracks formed on an optical disk in a concentric or spiral manner while a substantially circular optical spot irradiates the recording tracks and serves to convert a reflection light from the optical disk into an electric signal. Respective detector portions of the four dividing detector 1 are so disposed that when the optical spot is divided into two halves in a direction of the recording tracks, the detector portions $1_1$ and $1_2$ detect one half of the reflection light while the detector portions $1_3$ and $1_4$ detect another half of the reflection light.

An adder 2 serves to provide an added voltage signal $(S_1+S_2)$ which is obtained by adding voltage signals $S_1$ and $S_2$ from the detector portions $1_1$ and $1_2$, respectively, to each other, while an adder 3 serves to provide an added voltage signal $(S_3+S_4)$ which is obtained by adding voltage signals $S_3$ and $S_4$ from the detector portions $1_3$ and $1_4$, respectively, to each other. An adder 4 serves to add these added voltage signals $(S_1+S_2)$ and $(S_3+S_4)$ to each other to provide a light quantity voltage signal $S_5$ which is equal to $(S_1+S_2+S_3+S_4)$. A subtracter 5 serves to provide a tracking error signal $S_6$ which corresponds to a signal $[(S_3+S_4)-(S_1+S_2)]$.

Figure 2A:
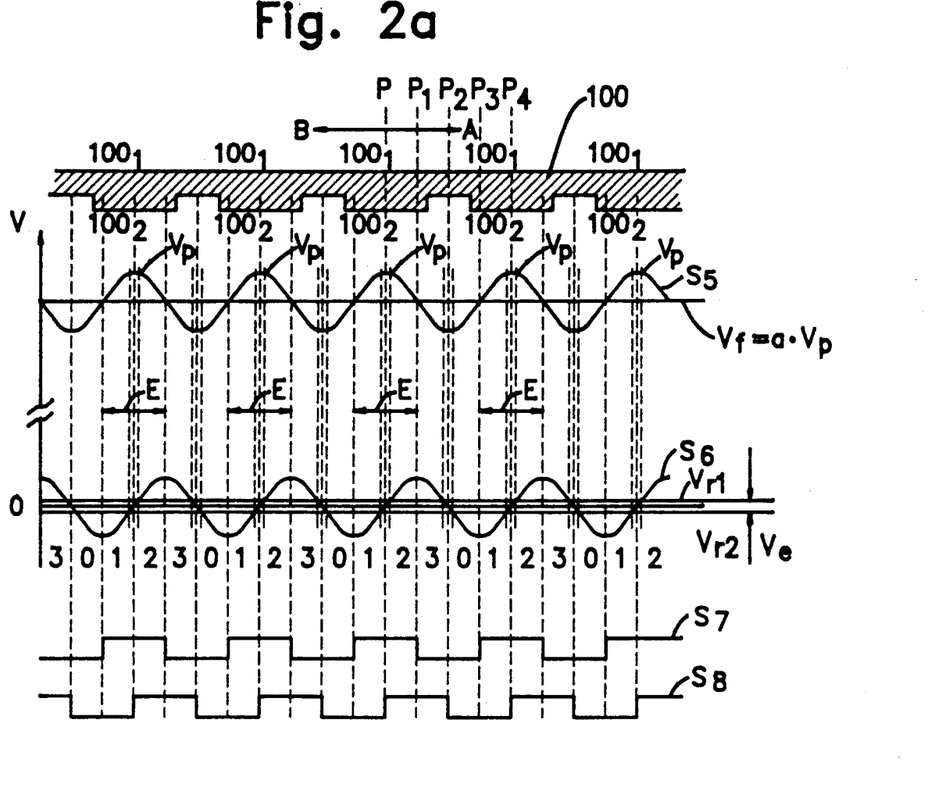
FIGS. 2a and 2b illustrate a relation of a sample voltage, a light quantity signal and deformed signals processed by the apparatus of the invention.

FIG. 2a illustrates a relation of the light quantity signal $S_5$, the tracking error signal $S_6$ and the optical disk 100. When the optical pick-up moves in a direction indicated by A or B of FIG. 2a, that is, a direction of a radius of the optical disk on an irradiation face thereof in which grooves $100_1$ of predetermined shape are formed having an equal space, the light quantity signal $S_5$ and the tracking error signal $S_6$ vary corresponding to the position of movement of the optical pick-up, having a substantially sine-wave shape, as shown in FIG. 2a. The light quantity voltage signal $S_5$ has the maximum value at the center position of the respective recording tracks $100_2$ and has the minimum value at the center position of the respective grooves $100_1$ while the tracking error signal $S_6$ has a waveform of phase shifted by 90 degrees relative to that of the light quantity voltage signal $S_5$ and has the value of zero at the center positions of the recording tracks $100_2$ and the grooves $100_1$.

This is because the added voltage signals $(S_1+S_2)$ and $(S_3+S_4)$ have the same amplitude and the appropriate phase difference relative to each other. More particularly, this is because there occurs an accurate phase difference of 90 degrees between the added signals of two sine wave of the same amplitude and the phase difference and the subtracted signals thereof.

As shown in FIG. 1, the tracking error signal $S_6$ is input to a minus input terminal of a comparator 6, to a plus input terminal of a comparator 7 and to a plus input terminal of a comparator 9 while the light quantity signal $S_5$ is input to a plus input terminal of a comparator 10 and to a movable terminal of a switch SW1. The comparators 6, 7, 9 and 10 and the switch SW1, together with an AND circuit 8, form a waveform forming circuit 11 as the signal processing circuit of the invention. A stationary terminal of the switch SW1 is connected to ground through a capacitor C1 and resistors R1 and R2, respectively. Respective output terminals of the comparators 6, 7 and 10 are connected to respective input terminals of the AND circuit 8, an output terminal of which is connected to a control terminal of the switch SW1. The switch SW1 is adapted to be closed only when a control signal input to the control terminal thereof is on the condition of "H". Reference voltages Vr1 and Vr2 are applied to a plus input terminal of the comparator 6 and to a minus input terminal of the comparator 7, respectively. Minus input terminals of the comparators 9 and 10 are connected to ground and to a connection point of the resistors R1 and R2, respectively.

An operation of the waveform forming circuit 11 which serves to deform the tracking error signal $S_6$ and the light quantity voltage signal $S_5$ will be described with reference to FIGS. 1 and 2 hereinbelow.

By comparing the tracking error signal $S_6$ corresponding to the subtracted signal of the voltage signals $(S_3+S_4)$ and $(S_1+S_2)$ with a ground level (OV) by the comparator 9 is provided a two value deformed signal $S_8$ having inversion points of values "H" and "L" coincident with the center positions of the recording tracks $100_2$ and the grooves $100_1$ of the optical disk 100.

Since the light quantity signal $S_5$ is the added signal of the voltage signals $(S_1+S_2)$ and $(S_3+S_4)$, a two value signal which is shifted by 90 degrees relative to the deformed signal $S_8$ is provided by comparing the light quantity signal $S_5$ with a predetermined comparison voltage Vf which is nearly equal to an average level voltage.

Suppose that a tracking of the optical pick-up is so controlled that the optical spot is positioned at the position P of FIG. 2a, a deformed signal $S_7$ which is an output signal of the comparator 10 is on the condition of "H", as described later. At that time, the AND circuit 8 outputs the "H" signal to thereby close the switch SW1 because the level of the tracking error signal $S_6$ is within a level range Ve between the reference voltage Vr1 (set on a plus side) and the reference voltage Vr2 (set on a minus side) which are set nearly at the value of zero. Accordingly, the comparator 10 compares the voltage $V_{S5}$ of the light quantity signal $S_5$ with a voltage $\alpha \cdot V_{S5}$ which is obtained by dividing the voltage $V_{S5}$ by the resistors R1 and R2 and, as a result, the deformed signal $S_7$ is maintained at the condition of "H". The coefficient "$\alpha$" is a ratio of voltage division and is expressed as follows;

$$\alpha = R2/(R1+R2)$$

As the optical spot moves in the direction of "A" of FIG. 2a, for example, the switch SW1 is opened when the voltage level of the tracking error signal $S_6$ is higher than the reference voltage Vr1, and the comparator 10 compares a voltage value of $\alpha \cdot Vp$ with the light quantity signal $S_5$ which can be accomplished by the fact that the capacitor C1 holds a sample voltage Vp of the light quantity voltage signal $S_5$. It should be noted that the ratio of voltage division $\alpha$ is so set that the voltage value of $\alpha \cdot Vp$ has the same level as that of the comparison voltage Vf.

Thus, as the optical spot continues to move in the direction of "A" of FIG. 2a, the condition of the deformed signal $S_7$ is inverted from "H" to "L" at the position of $P_1$ and the voltage $V_{S6}$ of the tracking error signal $S_6$ falls within the level range of Ve nearly at the position of $P_2$. At that time, since the deformed signal $S_7$ is on the condition of "L", the AND circuit 8 holds the output of "L", which prevents the light quantity signal $S_5$ from being sampled. As the optical spot reaches the position of $P_3$, the condition of the deformed signal $S_7$ is inverted from "L" to "H" and, nearly at the position of $P_4$, the voltage $V_{S6}$ again falls within the level range of Ve. At that time, since the deformed signal $S_7$ is on the condition of "H", the switch SW1 is closed to again sample the light quantity signal $S_5$ so that the next sampled voltage Vp is held. In this manner, the same operation is repeated so that the light quantity signal $S_5$ has the voltage value Vp sampled nearly at peak thereof every one period and so that the divided value of the sampled voltage value Vp is compared with the light quantity voltage signal $S_5$.

Although the operation when the optical pick-up moves in the direction of "B" of FIG. 2a is substantially identical to that when it moves in the direction of "A" of FIG. 2a, and the description thereof will be omitted, the deformed signal $S_7$ from the comparator 7 synchronizes with light quantity signal $S_5$ and has the waveform of phase shifted by 90 degrees relative to the deformed signal $S_8$ as shown in FIG. 2a. As aforementioned, since the comparison voltage Vf has level lower than that of the sampled voltage Vp, the deformed signal $S_7$ is always maintained at the state of "H" in case of the tracking of the optical pick-up being controlled at the position of the recording tracks as indicated by "P".

Figure 2B:
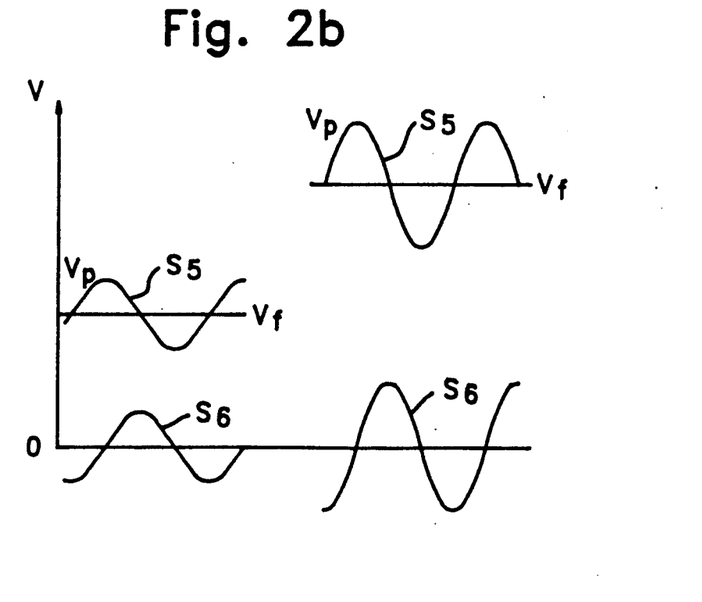

FIG. 2b shows the states of the light quantity voltage signal $S_5$ and the tracking error signal $S_6$ when the level of the reflection light quantity varies due to variation in a reflection factor of the optical disk 100 or in the light quantity of the optical spot. The respective voltage levels of the light quantity voltage signal $S_5$ and the tracking error signal $S_6$ vary in proportion to the level of the reflection light quantity. Accordingly, if the comparison voltage Vf is set in proportion to this, they can be compared always on the same condition. Since the comparison voltage Vf is at $\alpha \cdot Vp$ and the sampled voltage Vp is renewed every one period, the comparison voltage Vf is always proportional to the light quantity level, which causes the comparison to be possible in the same condition.

The optical spot control also comprises a velocity detection circuit 16 which serves to detect a velocity of the optical spot, and will be described with reference to FIG. 1.

The velocity detection circuit 16 comprises four operational amplifiers 12, 13 14 and 15 and four switches SW2, SW3, SW4 and SW5. The tracking error signal $S_6$ is applied through a capacitor C2 to a minus input terminal of the operational amplifier 12 while the light quantity voltage signal $S_5$ is applied through a capacitor C3 to a minus input terminal of the operational amplifier 13. An output terminal of the operational amplifier 12 is connected directly to respective movable terminals of the switches SW2 and SW3 and also through a resistor R3 to the minus input terminal of the operational amplifier 12. An output terminal of the operational amplifier 13 is connected directly to respective movable terminals of the switches SW4 and SW5 and also through a resistor R6 to the minus input terminal of the operational amplifier 13. Respective stationary terminals of the switches SW2 and SW4 are connected through resistors R4 and R7 to a minus input terminal of the operational amplifier 14, while respective stationary terminals of the switches SW3 and SW5 are connected through resistors R5 and R8 to a minus input terminal of the operational amplifier 15. An output terminal of the operational amplifier 15 is connected through a resistor R9 to the minus input terminal of the operational amplifier 15 and also through a resistor R10 to the minus input terminal of the operational amplifier 14, while an output terminal of the operational amlifier 14 is connected through a resistor R11 to the minus input terminal of the operational apmlifier 14. Plus input terminals of the operational amplifiers 12, 13, 14 and 15 are connected to ground.

An operation of the velocity detection circuit 16 of FIG. 1 will be described with reference to FIG. 3 hereinbelow.

Figure 3:
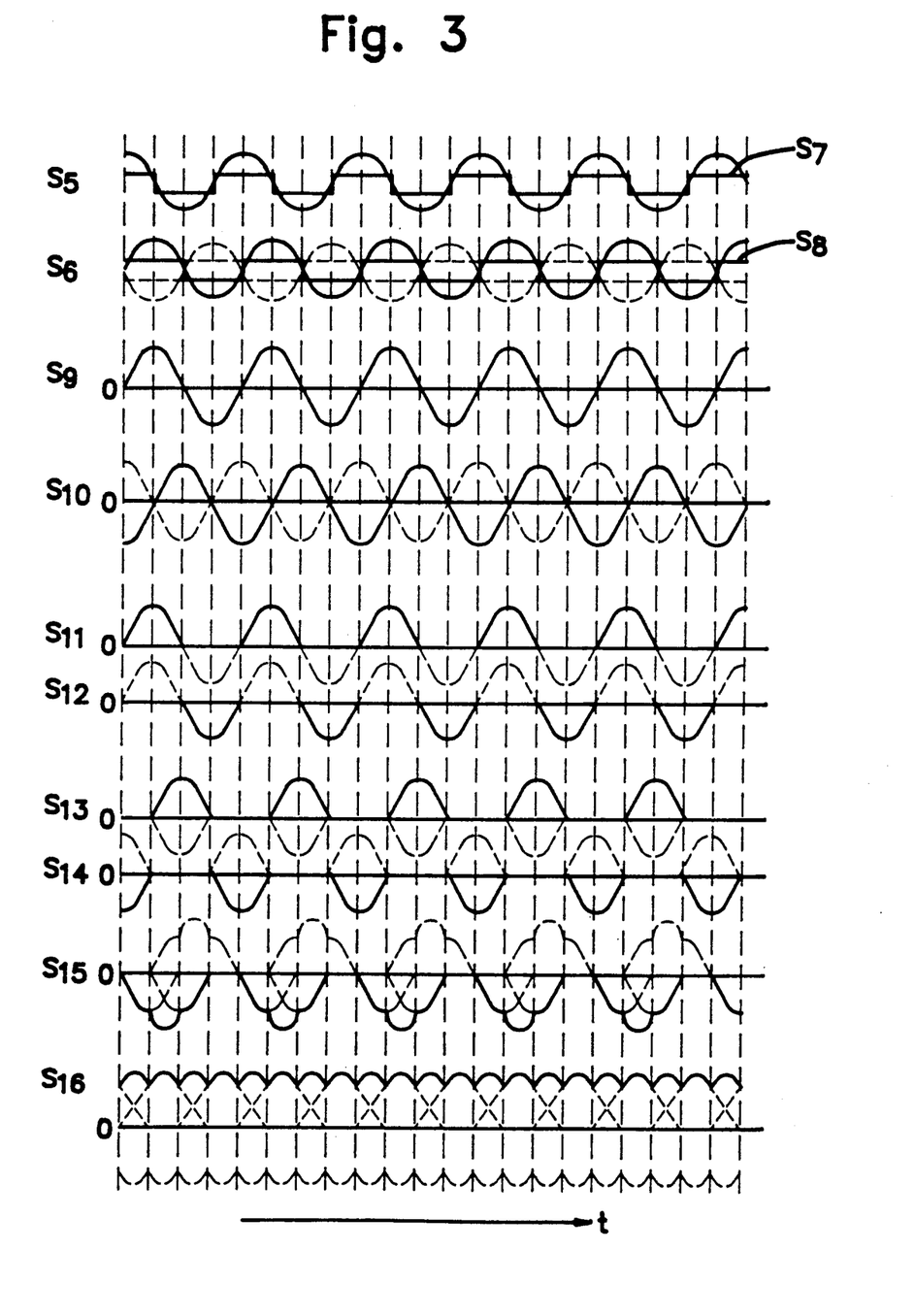
FIG. 3 illustrates waveforms of voltage signals at portions of the moving velocity circuit used for the invention.

FIG. 3 illustrates waveforms of voltages detected at portions of the velocity detection circuit 16 when the optical spot moves in the direction of "A" of FIG. 2a from the position of "P" at a velocity of "V". In this figure, the solid line shows the waveforms of the detected voltages and a horizontal axis shows lapse time "t". Only an AC component of the light quantity voltage signal $S_5$ is shown in this figure and the amplitudes of the light quantity signal $S_5$ and the tracking error signal $S_6$ are shown to be set equal to each other to simplify the description thereof.

The operational amplifier 13 which forms a differentiator together with the capacitor C3 and the resistor R6 provides a differential signal $S_9$ which is obtained by differentiating and inverting the light quantity voltage signal $S_5$, while the operational amplifier 12 which forms a differentiator together with the capacitor C2 and the resistor R3 provides a differential signal $S_{10}$ which is obtained by differentiating and inverting the tracking error signal $S_6$. The switch SW5 is so controlled by the deformed signal $S_8$ that it is closed or opened in accordance with the state "H" or "L" of the deformed signal $S_8$. Thus, there appears a positive half wave signal $S_{11}$ of the differential signal $S_9$ at the stationary terminal of the switch SW5. There appears a negative half wave signal $S_{12}$ of the differential signal $S_9$ at the stationary terminal of the switch SW4 which is controlled by the deformed signal $\overline{S_8}$ supplied from an inverter 29 which is connected to the output terminal of the comparator 9 in the waveform forming circuit 11.

Similarly, there appear a negative half wave signal $S_{14}$ of the differential signal $S_{10}$ and a positive half wave signal $S_{13}$ thereof at the respective stationary terminals of the switches SW2 and SW3 which are controlled by the deformed signals $S_7$ and $\overline{S_7}$, respectively.

The operational amplifier 15 which forms an inversion type adder together with the resistors R5, R8 and R9 provides an added signal $S_{15}$ which is obtained by adding and inverting the positive half wave signals $S_{11}$ and $S_{13}$. The operational amplifier 14 which forms an inversion type adder together with the resistors R4, R7, R10 and R11 provides an added signal $S_{16}$ which is obtained by adding and inverting the negative half wave signals $S_{12}$ and $S_{14}$ and the added signal $S_{15}$. Thus, the absolute value of the added signal $S_{16}$ corresponds to the value of the differential signals $S_9$ and $S_{10}$ added after they are full-wave rectified and the average level of the added signal $S_{16}$ is proportional to the moving velocity "v" of the optical spot.

An operation of the velocity detection circuit 16 when the optical spot moves at the moving velocity of "v" in the direction of "B" of FIG. 2a from the position of "P" will be described hereinbelow.

The tracking error signal $S_6$ appears in such a manner that the phase of the tracking error signal $S_6$ is advanced by 90 degrees relative to that of the light quantity voltage signal $S_5$, as indicated by a dotted line of FIG. 3. As indicated by dotted lines of FIG. 3, there appear half wave signals $S_{11}$, $S_{12}$, $S_{13}$ and $S_{14}$ at the stationary terminals of the switches SW2, SW3, SW4 and SW5, respectively. It will be noted from a dotted line of FIG. 3 that the added signal $S_{16}$ obtained by adding the half wave signals $S_{11}$ through $S_{14}$ has a polarity reverse to that of the added signal $S_{16}$ of the solid line obtained when the optical spot moves at the moving velocity of "v" in the direction of "A" of FIG. 2a.

It will be understood that the level of the absolute value of the added signal $S_{16}$ indicates the amplitude of the moving velocity "v" of the optical spot, while the polarity thereof indicates the direction in which it moves. In this manner, the state of movement of the optical spot can be found from the added signal $S_{16}$.

Although, in the aforementioned embodiment, the amplitudes of the tracking error signal $S_6$ and the light quantity signal $S_5$ are equal to each other, it will be understood that such an added signal $S_{16}$ as indicated in FIG. 3 can be obtained by appropriately setting the values of the resistors even though the amplitudes of the tracking error signal $S_6$ and the light quantity signal $S_5$ are different from each other. As shown in FIG. 1, a smoothing circuit 28 may be preferably provided in the output side of the operational amplifier 14 so that a ripple is removed from the added signal $S_{16}$. Although, in the aforementioned embodiment, the switches SW1 through SW5 may be of relay type having the movable and stationary terminals, it will be understood that they may be replaced by electronic switches such as analog switches.

The optical spot control also comprises a position detection circuit 24 which serves to detect a track position of the optical spot on the optical disk, and will be described with reference to FIG. 1.

The position detection circuit 24 comprises two D type flip-flop circuits (referred to as DFF circuit hereinafter) 17 and 18, two exclusive OR circuits (referred to as E-OR circuit hereinafter) 21 and 22 and an 8 bit binary up-down counter (referred to as up-down counter hereinafter) 23.

The DFF circuit 17 has a D input terminal to which the deformed signal $S_8$ is applied and a Q output terminal which is connected to respective one input terminals of the E-OR circuits 21 and 22 and is also connected to a D input terminal of the DFF circuit 18. The position detection circuit 24 comprises an input terminal $24_1$ to which is applied from a clock pulse generator not shown a clock pulse signal (referred to as CP signal) $S_{17}$ having a period shorter than the minimum period of the deformed signal $S_8$. The input terminal $24_1$ of the position detection circuit 24 is connected directly to a CP input terminal of the DFF circuit 17 and also through an inverter 19 to a CP input terminal of the DFF circuit 18. The deformed signal $S_7$ is applied to another input terminal of the E-OR circuit 22 and also to the inverter 20. Another input terminal of the E-OR circuit 21 is connected to a Q output terminal of the DFF circuit 18. A pulse signal input terminal $23_1$, an up-down signal input terminal $23_2$ and an ENABLE input terminal of the up-down counter 23 are connected to an output terminal of the E-OR circuit 21, a $\bar{Q}$ output terminal of the DFF circuit 18 and an output terminal of the inverter 20, respectively.

An operation of the position detection circuit 24 will be described with reference to FIGS. 1, 2a and 4 hereinbelow.

Figure 4A:
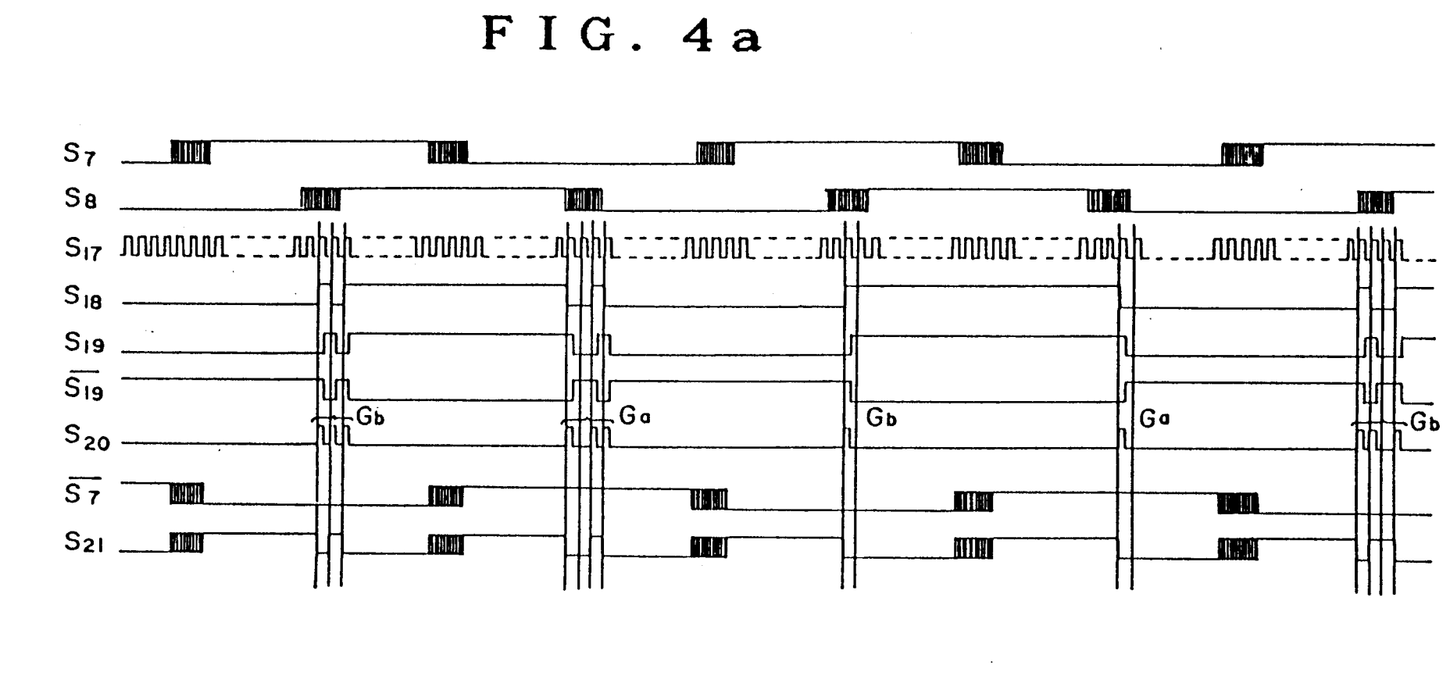
FIGS. 4a and 4b illustrate waveforms of signals at portions of an optical spot position detection circuit when an optical spot moves in different directions, respectively.

FIG. 4a illustrates waveforms of signals detected at portions of the position detection circuit 24 when the optical spot moves in the direction of "A" of FIG. 2a. The deformed signal $S_7$ provided by deforming the light quantity voltage signal $S_5$ has the phase advanced by 90 degrees relative to that of the deformed signal $S_8$ provided by deforming the tracking error signal $S_6$. It is supposed that there occur noises on inversion of the state of the deformed signals of FIG. 4a.

The DFF circuit 17 receives the deformed signal $S_8$ in synchronization with raising-up of the CP signal $S_{17}$ and sequentially outputs a receiving signal $S_{18}$ from the Q output terminal thereof. Thus, the receiving signal $S_{18}$ has the repeated state of "H" and "L" in accordance with timing of receiving the deformed signal $S_8$ on inversion of the state when there occurs a noise of the deformed signal $S_8$, but has the same state that the deformed signal $S_8$ has on other time. The DFF circuit 18 receives the receiving signal $S_{18}$ with an inversion signal $\overline{S_{17}}$ of the CP signal $S_{17}$ and as a result outputs a delayed signal $S_{19}$ which is obtained by delaying the receiving signal $S_{18}$ by half period of the CP signal $S_{17}$. The E-OR circuit 21 outputs an inversion pulse signal $S_{20}$ which is an E-OR signal of the receiving signal $S_{18}$ and the delayed signal $S_{19}$, which synchronizes with the inversion of the state of the receiving signal $S_{18}$ and has the number of pulses equal to the number of inversions. Accordingly, the pulses of the inversion pulse signal $S_{20}$ occur on inversion of the state of the deformed signal $S_8$ and have the number of pulses varying on the state of occurrence of noise, but the number of pulses of respective pulse groups G occurring on respective inversions is always odd. The DFF circuit 18 outputs from a $\bar{Q}$ output terminal an up-down signal $\overline{S_{19}}$ which has a phase reverse to that of the delayed signal $S_{19}$, but the inversion of state of the up-down signal $S_{19}$ appears in a delayed manner relative to the occurrence of pulses of the inversion pulse signal $S_{20}$. The up-down counter 23 receives the up-down signal $\overline{S_{19}}$, the inversion pulse signal $S_{20}$ and a prohibition signal $\overline{S_7}$ which is an inversion signal of the deformed signal $S_7$. The up-down counter 23 counts down every pulse input of the inversion pulse signal $S_{20}$ at the state of "H" of the up-down signal $\overline{S_{19}}$ and counts up every pulse input of the inversion pulse signal $S_{20}$ at the state of "L" of the up-down signal $\overline{S_{19}}$. It should be noted that the counting operation is made only at the state of "H" of the prohibition signal $S_7$, but not at the state of "L" thereof.

The inversion pulse signal $S_{20}$ generated on inversion of the state of the deformed signal $S_8$ has an alternate appearance of a pulse group Ga occurring by following the variation in the state of deformed signal $S_8$ from "H" to "L" and having a first pulse occurring at the state of "L" of the up-down signal $S_{19}$ and a pulse group Gb occurring by following the variation in the state of deformed signal $S_8$ from "L" to "H" and having a first pulse occurring at the state of "H" of the up-down signal $\overline{S_{19}}$. However, when the optical spot moves in the direction of "A" of FIG. 2a, the pulses of the pulse group Gb are never counted because of the pulse group Gb appearing always at the state of "L" of the prohibition signal $\overline{S_7}$. Thus, the up-down counter 23 counts only the pulses of the pulse group Ga and counts up or down in accordance with the state of the up-down signal $\overline{S_{19}}$, but counts up by one count every input of the pulse group Ga, that is, every one period of the deformed signal $S_8$. In this manner, the result of counting is sequentially output as a binary 8 bit signal from respective output terminals $23_4$ through $23_{11}$ to a control circuit 27. The output terminals $23_4$ and $23_{11}$ correspond to MSB and LSB, respectively.

The control circuit 27 receives the receiving signal $S_{18}$ and an inversion signal $S_{21}$ which is an E-OR signal of the receiving signal $S_{18}$ and the deformed signal $S_7$. The receiving signal $S_{18}$ is held at the state of "L" when the pulse group Ga of the inversion pulse signal $S_{20}$ stops occurring and at the state of "H" when the pulse group Gb stops occurring. On the other hand, the inversion signal $S_{21}$ has a repeated inversion of state thereof every inversion of state of the receiving signal $S_{18}$ and the deformed signal $S_7$. Accordingly, the inversion of state is repeated four times at an equal space during one period of the deformed signal $S_8$ except for the inversion based on noises of the deformed signals $S_7$ and $S_8$ and the state of "L" is generated when the pulse group Ga stops occurring. Thus, the binary 2 bit signal by which the inversion signal $S_{21}$ and the receiving signal $S_{18}$ are expressed varies in order of 0, 1, 2 and 3 while the up-down counter 23 counts up by one count.

Figure 4B:
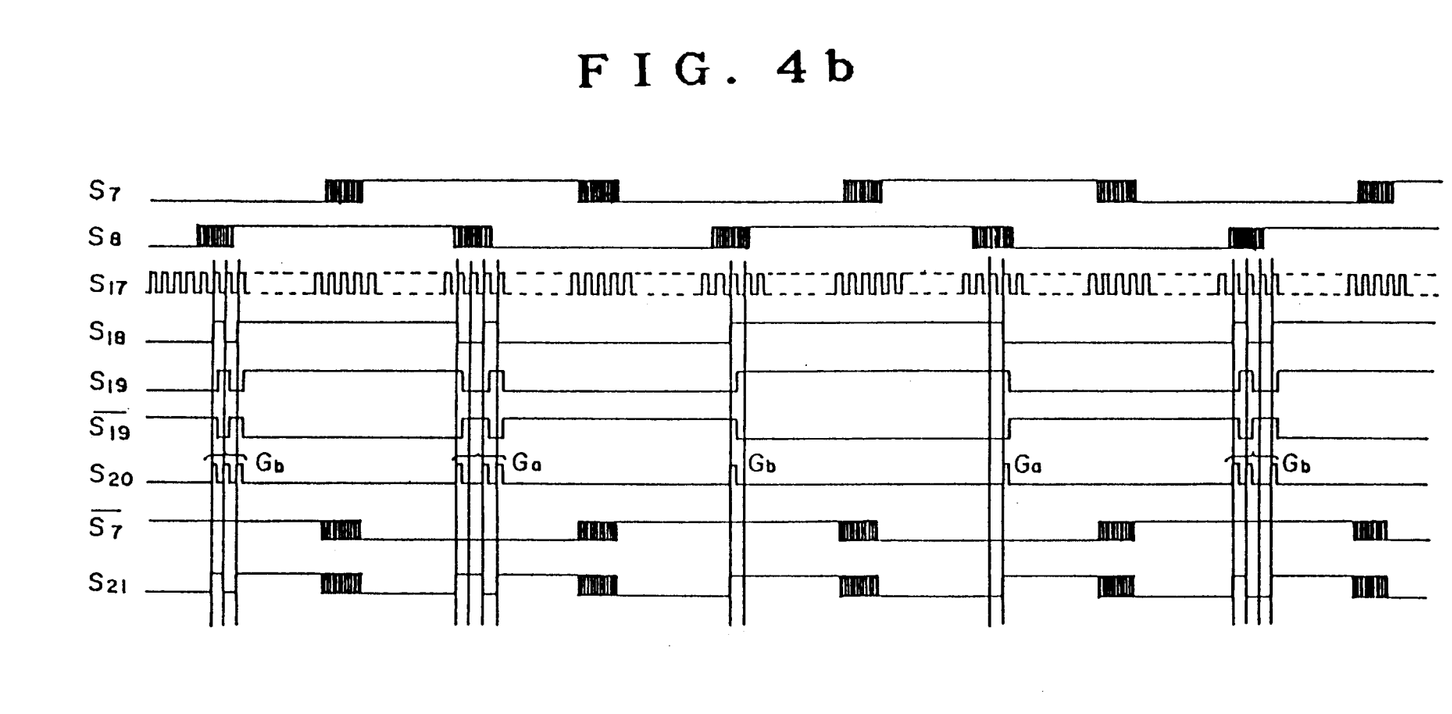

FIG. 4b illustrates waveforms of signals detected at portions of the position detection circuit 24 when the optical spot moves in the direction of "B" of FIG. 2a. The deformed signal $S_7$ provided by deforming the light quantity voltage signal $S_5$ has the phase delayed by 90 degrees relative to that of the deformed signal $S_8$ provided by deforming the tracking error signal $S_6$. It is supposed that there occur chattering noises on inversion of the state of the deformed signals of FIG. 4b.

Since the conditions of operation of the circuit portions are identical to those of the aforementioned operation, the detailed description of them will be omitted. As the pulse groups Ga and Gb appear, the prohibition signal $\overline{S_7}$ is at the states of "L" and "H", respectively. Accordingly, the up-down counter 23 counts only pulses of the pulse group Gb and counts up or down in accordance with the respective states of the up-down signal $\overline{S_{19}}$, but counts down by one count every input of the pulse group Gb, that is, every one period of the deformed signal $S_8$. At that time, the receiving signal $S_{18}$ is held at the states of "H" and "L" when the pulse groups Ga and Gb stop occurring, respectively. On the other hand, the inversion signal $S_{21}$ is at the state of "H" when the pulse group Gb stops occurring. Thus, the binary 2 bit signal by which the inversion signal $S_{21}$ and the receiving signal $S_{18}$ are expressed varies in order of 3, 2, 1 and 0 while the up-down counter 23 counts down by one count.

As aforementioned, the up-down counter 23 of the position detection circuit 24 counts up by the counting number corresponding to the traversing number when the optical spot traverses the recording tracks on the optical disk in the direction of "A" of FIG. 2a and counts down by the counting number corresponding to the traversing number in the direction of "B" of FIG. 2b. The value indicated by the 2 bit binary signal formed of the inversion signal $S_{21}$ and the receiving signal $S_{18}$ indicates an area where the optical spot exists in the area where the distance between the adjacent recording tracks $100_1$ are divided into four portions. When the optical spot passes through the area where a noise occurs on inversion of the state of the deformed signal $S_8$ while it moves in one direction, the groups of pulses of odd number occur, but when the movement of optical spot changes its direction on the way of the noise area, the groups of pulses of even numbers occur only within the noise area. In addition thereto, counting up and down is made in a repeated manner, which causes error counting to never occur even during such a transition state of the deformed signal $S_8$.

Thus, the control circuit 27 receives the group of the binary 8 bit signals $S_{22}$ from the up-down counter 23 to thereby detect the track position of the optical spot and receives the group of the binary 2 bit signals $S_{23}$ formed of the inversion signal $S_{21}$ and the receiving signal $S_{18}$ to thereby detect the area where the optical spot exists.

The control circuit 27 supplies to a moving velocity control circuit 25 a velocity setting signal $S_{24}$ indicating a predetermined direction in which the optical spot jumps the recording tracks and a predetermined velocity at which the optical spot jumps it, and also supplies to a tracking control circuit 26 a control switching signal $S_{25}$ for switching one of the tracking control and the moving control to the other.

The moving control circuit 25 receives the velocity setting signal $S_{24}$ and the added signal $S_{16}$ indicating the moving direction of the optical spot and the moving velocity thereof to supply to the tracking control circuit 26 a velocity control signal $S_{26}$ for controlling the movement of the optical spot in a desired condition based on the velocity setting signal $S_{24}$.

The tracking control circuit 26 is adapted to control the optical pick-up in a zero-cross manner so that the optical spot tracks the center of the recording tracks $100_2$ based on the tracking error signal $S_6$ on its tracking control and to move the optical spot based on the velocity control signal $S_{26}$ on track-jumping control of the optical spot.

It is when the group of the binary 2 bit signals $S_{23}$ indicates 1 or 2 that the control switching signal $S_{25}$ from the control circuit 27 switches the control of the optical spot from the moving control to the tracking control. This enables a drawing area of the tracking control to be set at an area E as shown in FIG. 2a and causes no erroneous operation to be made on switching the control of the optical spot.

It will be noted that the tracking control position of the optical spot corresponds to a boundary of the areas of 1 and 2 which the binary 2 bit signal group $S_{23}$ indicates and that the up-down counter 23 counts when the optical spot passes through a boundary between an area of 0 and an area of 3. Thus, it will be also noted that even if the value of the binary 8 bit signal group $S_{22}$ from the up-down counter 23 is so constructed to be indicated by an indicator not shown, the indicated value on tracking control never varies on counting up or down.

Although the number of tracks is offset when the up-down counter 23 counts in an erroneous manner, there is no change of relation between the value the binary 2 bit signal group $S_{23}$ indicates and the respective areas, which enables the control to be switched without any erroneous operation.

Although one embodiment of the invention has been illustrated and described with reference to the accompanying drawings, it will be understood by those skilled in the art that it is by way of example, and that various changes and modifications may be made without departing from the spirit and scope of the invention. For example, although, in the embodiment, the comparison voltage Vf is provided by holding as a sample voltage the value of voltage near the maximum level of the light quantity voltage signal $S_5$ during one period thereof and dividing the sample voltage by the dividing resistors, it may be provided by holding as a sample voltage the value of voltage near the minimum level of the light quantity voltage signal $S_5$ during one period thereof and by then amplifying it at a predetermined ratio. Also, although, in the embodiment, the dividing resistors R1 and R2 may be disposed at the output side of the switch SW1, it may be disposed at the input side thereof. It should be noted that the invention is intended to be defined only by the appended claims.

What is claimed is;

1. A signal processing circuit for an optical disk apparatus to detect a sine wave tracking error signal obtained when an optical spot on an optical disk moves in a direction of a radius of said optical disk and a sine wave whole reflection light quantity signal having a component of phase offset by 90 degrees relative to said tracking error signal and to deform said sine wave whole reflection light quantity signal so that a deformed signal is provided which has states of "H" and "L" selected on timing when said whole reflection light quantity signal traverses a center level of its amplitude, said signal processing circuit comprising:

signal detection means to detect said tracking error signal and said whole reflection light quantity signal;

sample hold means to provide a comparison signal sequentially having a sampling state changing its level in proportion to said whole reflection light quantity signal at a predetermined ratio and a holding state having a constant level in synchronization with a switching signal;

comparison means to provide a deformed signal having states of "H" and "L" by comparing said comparison signal with said whole reflection light quantity signal;

level determination means to provide a determination signal indicating whether a level of said tracking error signal is within an area of predetermined level near a center of its amplitude;

switch means to input said deformed signal and said determination signal to provide said switching signal synchronizing with said deformed signal and said determination signal at a predetermined timing for controlling said sample hold means;

and said comparison signal being at said sampling state only when said tracking error signal is within said predetermined area and said deformed signal is at one of states "H" and "L" while said comparison signal is at said holding state when said tracking error signal is not within said predetermined area or when said deformed signal is at the other of said states of "H" and "L".

2. A signal processing circuit for an optical disk apparatus as set forth in claim 1, and wherein said sample hold means forms said comparison signal by dividing a sampled voltage near the maximum level of a light quantity voltage signal during one period thereof using dividing resistors.

3. A signal processing circuit for an optical disk apparatus as set forth in claim 1, and wherein said sample hold means forms said comparison signal by amplifying a sampled voltage near the minimum level of a light quantity voltage signal during one period thereof at a predetermined ratio.

* * * * *